United States Patent [19]
Saita

[11] 3,946,708
[45] Mar. 30, 1976

[54] DEVICE FOR ADJUSTING IGNITION TIME FOR INTERNAL COMBUSTION ENGINE

[75] Inventor: Toshikazu Saita, Himeji, Japan

[73] Assignee: Mitsubishi Denki Kabushiki Kaisha, Japan

[22] Filed: Oct. 19, 1973

[21] Appl. No.: 408,077

Related U.S. Application Data

[63] Continuation of Ser. No. 173,986, Aug. 23, 1971.

[30] Foreign Application Priority Data

Sept. 1, 1970   Japan............................ 45-86979[U]

[52] U.S. Cl. ......................... 123/117 R; 123/148 E
[51] Int. Cl.² ............................................ F02P 5/04
[58] Field of Search ...... 123/148 E, 117 R, 146.5 A

[56] References Cited
UNITED STATES PATENTS
3,626,455   12/1971   Toda............................... 123/117 R Primary Examiner—Wendell E. Burns
Assistant Examiner—Ronald B. Cox
Attorney, Agent, or Firm—Robert E. Burns; Emmanuel J. Lobato; Bruce L. Adams

[57] ABSTRACT

The disclosed device comprises a thyristor and a first set of breaker's contacts serially interconnected across a second set of breaker's contacts used in the normal operation. In the idling and low speed operations, the thyristor is conducting so that the first contact set causes the receding ignition. In the dual system of ignition one series combination of thyristor and set of breaker's contacts is provided on either of the advancing and receding sides. Normally both thyristors are conducting but the receding thyristor alone is conducting to permit the receding ignition in the idling and low speed operations.

2 Claims, 2 Drawing Figures

INVENTOR

BY

ATTORNEY

DEVICE FOR ADJUSTING IGNITION TIME FOR INTERNAL COMBUSTION ENGINE

This is a continuation of application Ser. No. 173,986, filed Aug. 23, 1971.

BACKGROUND OF THE INVENTION

The invention relates to a device for adjusting the ignition time of an internal combustion engine for a motor vehicle in order to minimize a volume of poisonous exhaust gas from the engine.

In the idling and low speed modes of operation, internal combustion engines for motor vehicles produce poisonous exhaust gases in large volumes. In order to minimize the volume of poisonous exhaust gas from such engines, it has been already practiced to adjust the ignition time of the engines in accordance with the mode of operation thereof. For example, a plurality of relays have be provided one for each of mode sensors for sensing the respective modes of operation of the engine and selectively energized in accordance with the outputs from the associated mode sensors to adjust the ignition time of the engine. Alternatively, the outputs from such mode sensors could be processed by a logic circuitry to control a single relay for adjusting the ignition time of the engine. With the sensors each formed of a semiconductor circuit or with the outputs from the sensors processed by a semiconductor logic circuitry, the resulting adjusting device has been often disposed within a compartment of the associated motor vehicle. This is because the device disposed within an engine space maintained at an elevated temperature of the vehicle causes a decrease in reliability of the same. In that event, if a control element involved is formed of a relay or relays then a problem has arisen as to noise generated upon closing and opening electric contacts included in the relay or relays. In order to avoid this problem, only the relay or relays might be disposed in the engine space. This, however, has resulted in the complicated wiring around the relay or relays and also in a decrease in the system reliability as well as very inconvenience in practice use.

SUMMARY OF THE INVENTION

Accordingly it is an object of the invention to provide a new and improved device for adjusting the ignition time of an internal combustion engine, including solid state control means wherein the disadvantages of the conventional devices as above described are eliminated.

The invention accomplishes this object by the provision of an adjustment device for adjusting the ignition time of an internal combustion engine, comprising a pair of first and second sets of breaker's contacts different in opening time from each other, and means for changing the operation of the engine from a first mode of operation in which the ignition thereof is caused by the opening operation of the first set of breaker's contacts to a second mode of operation in which the ignition of the engine is caused only by the opening operation of the second set of breaker's contacts and vice versa, characterized in that the means for changing the mode of operation of the engine includes a semiconductor switching element connected to at least one of the first and second sets of breaker's contacts and responsive to a predetermined one of the first and second modes of operation of the engine to be controlled in conduction to enable that set of breaker's contacts connected to the semiconductor switching element to effect the ignition of the engine thereby to adjust the ignition time thereof.

In a preferred embodiment of the invention, the adjustment device may comprise a single ignition coil, a first set of breaker's contacts connected in series to the ignition coil to form a first circuit for supplying an electrical energy to the ignition coil, a semiconductor switching element responsive to a predetermined mode of operation of the engine to be conducting, and a second set of breaker's contacts connected in parallel to the first set of breaker's contacts through the semiconductor switching element to form a second circuit for supplying an electrical energy to the ignition coil with the semiconductor switching element, the first and second sets of breaker's contacts providing different ignition times for the engine, the arrangement being such that, when conducting, the semiconductor switching element enables the second set of breaker's contacts to ignite the engine and when nonconducting, enables the first set of breaker's contacts to ignite the engine.

For use with the dual system of ignition, the adjustment device may advantageously comprise a first ignition coil, a first semiconductor switching element and a first set of breaker's contacts connected in series circuit relationships to form a first circuit for supplying an electrical energy to the first ignition coil, and a second ignition coil, a second semiconductor switching element and a second set of breaker's contacts connected in series relationship to form a second circuit for supplying an electrical energy to the second ignition coil, the first and second sets of breaker's contacts providing different ignition times for the engine, the first and second supply circuit being connected in parallel to each other, the arrangement being such that the first and second semiconductor switching elements respond to a predetermined mode of operation of the engine to be put in their conducting state to enable the first and second sets of the breaker's contacts to effect the dual ignition of the engine, and respond to another predetermined mode of operation of the engine to be nonconducting and conducting respectively whereby only that set of breaker contacts connected to the now conducting semiconductor switching element is enabled to ignite the engine.

BRIEF DESCRIPTION OF THE DRAWING

The invention will become more readily apparent from the following detailed description taken in conjunction with the accompanying drawing in which.

DESCRIPTION OF THE PREFERRED EMBODIMENTS

Figure 1:
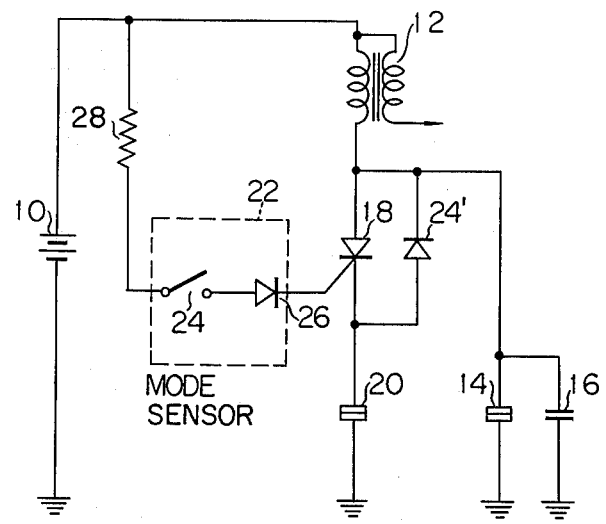
FIG. 1 is a schematic circuit diagram of a device for adjusting the ignition time of an internal combustion engine, constructed in accordance with the principles of the invention.

Referring now to FIG. 1 of the drawing, it is seen that an arrangement disclosed herein comprises a source of electrical energy shown as a battery 10 having a negative terminal connected to ground, and an ignition coil 12 connected to the source 10 at its positive terminal. The ignition coil 12 has a primary winding connected to ground through a set of breaker's contacts 14 connected across a capacitor 16, and a secondary winding electrically coupled to an internal combustion engine (not shown). The primary winding of the ignition coil 12 is also connected to ground through a series combination of a semiconductor switching element 18 such as a thyristor and another set of breaker's contacts 20. The thyristor 18 includes a gate electrode connected to a mode-of-operation sensor generally designated by the reference numeral 22. Thus it will be appreciated that the set of breaker's contacts 14 forms a first circuit for supplying an electrical energy to the ignition coil 12 and the thyristor 18 and the set of breaker's contacts 20 form a second circuit for supplying an electrical energy to the ignition coil 12. The sensor 22 is adapted to sense a predetermined mode of operation of the engine (not shown), in this case, the idling and low speed modes of operation.

While the mode sensor 22 may be formed of any desired circuit responsive to the predetermined mode of operation of the engine to apply a gating signal to the thyristor 18 it is shown in FIG. 1 as including a set of normally open contacts 24 and a semiconductor diode 26 connected thereto and also to the gate electrode of the thyristor 18. Although not illustrated, the set of contacts 24 is operatively coupled to a throttle valve disposed within an intake tube so that the contacts are closed through the closure of the throttle valve occurring in the idling and low speed modes of operation in which the engine exhausts a large volume of poisonous exhaust gas. The closure of the contacts 24 causes the source 10 to apply a voltage to the gate electrode of the thyristor 18 through a resistor 28, the now closed contacts 24 and the diode 26 to put the thyristor 18 in its conducting state.

The thyristor 18 is so poled as to permit a current from the primary ignition winding to pass to the set of breaker's contacts 20 therethrough and has a semiconductor diode 24' connected thereacross with the polarity reverse from that of the thyristor 18. The sets of breaker's contacts 14 and 20 are adapted to be opened and closed in synchronization with the rotational movement of the associated engine (not shown). It is assumed that the contacts 14 are opened at each time point at which the engine is to be ignited in the normal mode of operation while the contacts 20 are opened later than the contacts 14 which is suitable for the idling and low speed modes of operation. It is also assumed that both sets of contacts are disposed within a common distributor (not shown). If desired, both sets of breaker's contacts may be disposed within separate distributors (not shown), respectively.

The arrangement as above described is operated as follows: It is assumed that the engine (not shown) be delayed in ignition time. That is, the engine is in the normal mode of operation. Under the assumed condition, the mode sensor 22 has the contacts 24 maintained in their open position to supply no gating signal to the thyristor 18. Thus the thyristor 18 is maintained in its nonconducting state. This disables the set of breaker's contacts 20 and enables the set of breaker's contacts 14 to determine when the engine (not shown) is to be ignited. Therefore the normal ignition of the engine is accomplished under the control of the contacts 14.

It is now assumed that in the particular mode of operation, the ignition time of the engine should be delayed in order to clean the exhaust gas from the engine. That is, the engine is in the idling or low speed mode of operation. Under the assumed condition, the mode sensor 22 has the contacts 24 put in their closed position as will readily be understood from the above description. This permits the source 10 to apply a gating signal to the thyristor 18 to put the latter in its conducting state. Therefore the set of breaker's contacts 20 takes over the induction of an ignition voltage across the ignition coil 12. In other words, the contacts 20 are opened to interrupt a flow of current through the primary ignition winding whereupon an ignition voltage is induced across the secondary ignition winding resulting in the ignition of the engine (not shown).

Under these circumstances, the ignition of the engine is delayed as compared with the normal mode of operation because the contacts 20 are later in opening time than the contacts 14. It is noted that the opening of the contacts 14 has no effect upon the system because the contacts 14 are opened during the closure of the contacts 20.

After the termination of a flow of gating current through the thyristor 18, current flowing through the latter decreases below the holding current therefor due to the opening of the contacts 20 whereupon the thyristor 18 is turned off. This is ready for the normal mode of operation of the engine.

Figure 2:
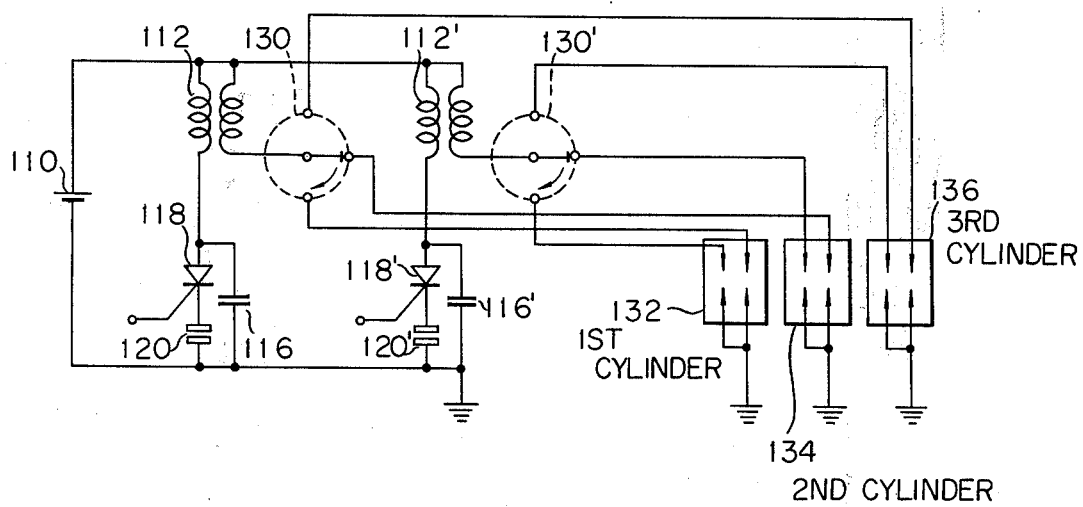
FIG. 2 is a diagram similar to FIG. 1 but illustrating a modification of the invention applied to the dual system of ignition.

Referring now to FIG. 2, there is illustrated a modification of the invention applied to the dual system of ignition wherein there are provided a pair of ignition coils controlled by the respective sets of breaker's contacts different in opening or ignition time from each other. In the arrangement shown in FIG. 2, a source of electrical energy in the form of a battery 110 is connected at its positive terminal to a pair of ignition coils 112 and 112' and at its negative terminal to ground. Connected across the source 110 are the primary winding of the first ignition coil 112, a first semiconductor switching element 118 in the form of a thyristor and a first set of breaker's contacts 120 in series circuit relationships, as in the arrangement shown in FIG. 1, to form a first circuit for supplying an electrical energy to the first ignition coil 120. A capacitor 116 is connected across the series combination of thyristor 118 and contacts 120. Also the primary winding of the second ignition coil 112', a second semiconductor switching element 118' in the form of a thyristor and a second set of breaker's contacts 120' are serially interconnected across the source 10 to form a second circuit for supplying an electrical energy to the second ignition coil 112'. That circuit is in parallel to the first supply circuit and has a capacitor 116' connected across the series combination of the thyristor 118' and the contacts 120'. The two sets of breaker's contacts 120 and 120' are disposed within separate distributors 130 and 130' although this is not necessarily essential.

Both ignition coils 112 and 112' each include a secondary winding selectively connected through the distributor 130 or 130' to a plurality of ignition plugs, in this case, three ignition plugs schematically shown respectively within three rectangles 132, 134 and 136 representing three cylinders of an internal combustion engine. Each of the cylinders 132, 134 or 136 has disposed therein a pair of ignition plugs adapted to be energized by the first and second ignition coils 112 and 112' respectively.

Like the sets of breaker's contacts 14 and 20, the first and second sets of breaker's contacts 120 and 120' are adapted to be opened and closed in synchronization with the rotational movement of the engine 132-134-136 so that the first set of contacts 120 is opened at the normal ignition time while the second set of contacts 120' is opened later than the first contacts 120. Thus it will be appreciated that the contacts 120 and the associated thyristor 118 are on the advancing side and that the contacts 120' and the thyristor 118' connected thereto are on the receding side.

In the normal mode of operation in which the dual ignition is successively effected within the cylinders 132, 134 and 136 of the engine, the first and second thyristors 118 and 118' have applied thereto the respective gating signals provided by separate mode sensors or a common mode sensor for sensing a predetermined mode of operation of the engine, in this example, the normal mode of operation. However, such a sensor or sensors is or are not illustrated in FIG. 2 only for purpose of simplification.

Therefore both thyristors 118 and 118' are put in their conducting state to permit the contacts 120 and 120' to be opened to induce ignition voltages across the secondary windings of the associated ignition coils 112 and 112'. Those ignition voltages are supplied through the respective distributors 130 and 130' to those two ignition plugs as just then connected to the individual ignition coils 112 and 112' through the distributors respectively. Therefore electric sparks are established across such ignition plugs. The process as above described is repeated to effect the dual ignition of the respective cylinders.

Then if the engine is operated in the idling or low speed mode resulting in the necessity of cleaning the exhaust gas therefrom then the abovementioned sensor or sensors (not shown) is or are operated such that a gating signal is applied to the thyristor 118' on the receding side while no gating signal is applied to the thyristor 118 on the advancing side. Therefore, in response to another predetermined mode of operation, the thyristor 118' is put in its conducting state but the thyristor 118 is brought into its nonconducting stated. Under these circumstances, the ignition coil 112 connected to the advancing thyristor 112 is prevented from inducing the ignition voltage thereacross but the ignition coil 112' on the receding side continues to induce the ignition voltage thereacross to successively ignite the cylinders 132, 134 and 136 in the manner as above described in conjunction with the normal mode of operation resulting in the receding ignition.

The thyristors are automatically turned off in the same manner as already described in conjunction with FIG. 1

The invention has several advantages. For example there are exhibited the same results as those provided by the conventional devices including the relay or relays through the use of the thyristor or thyristors put in the conducting and nonconducting states in accordance with the modes of operation of the associated engine and without the necessity of using any movable mechanical component. This results in a silent operation. Further the invention has the reliability as high as exhibited by other semiconductor circuits. Also it is simple in construction because the turning-off of the thyristor is automatically accomplished by the operation of the associated set of breaker's contacts after the gating signal has terminated.

While the invention has been illustrated and described in conjunction with a few preferred embodiments thereof it is to be understood that various changes and modifications may resorted to without departing from the spirit and scope of the invention. For example, the thyristor shown in the form of a unidirectional triode thyristor or an SCR may be replaced by a bidirectional triode thyristor.

What is claimed is:

1. In an ignition system: a supply of electrical energy; a first set of breaker contacts operative for effecting timing of said ignition system in a first timing mode; an ignition coil having a primary winding connected in series with said first set of breaker contacts and said supply of electrical energy; a second set of breaker contacts operative for effecting timing of said ignition system in a second timing mode; switching means comprising a thyristor connected to said first set of breaker contacts and said second set of breaker contacts and operable for disconnecting and connecting said second set of breaker contacts in parallel with the first set of breakers contacts thereby selecting said first timing mode and said second timing mode; and means for enabling said thyristor to disconnect or connect said second set of breaker contacts in parallel with said first set of breaker contacts thereby enabling the opening and closing of said first and second sets of breaker contacts respectively to control the conduction of said thyristor and the timing of the ignition system.

2. An ignition system according to claim 1 wherein said thyristor has a first terminal, a second terminal and a third terminal; means connecting said supply of electrical energy to said first terminal; means connecting said first set of breaker contacts to said second terminal in series circuit relationship; means connecting said second set of breaker contacts to said first terminal in parallel circuit relationship; and wherein said means for enabling said thyristor comprising said switching means is connected in series circuit relationship with said third terminal and connected in parallel circuit relationship with said supply of energy and operative in said first timing mode for switching said supply of electrical energy to said third terminal of said thyristor to render same operative for switching electrical energy to said first set of breaker contacts, and operative in said second timing mode for switching said supply of electrical energy to said first terminal of said thyristor to render same operative for switching electrical energy to said second set of breaker contacts.

* * * * *